United States Patent [19]

Moser et al.

[11] Patent Number: 5,314,614
[45] Date of Patent: May 24, 1994

[54] PROCESS FOR HYDROTREATING AN ORGANIC FEEDSTOCK CONTAINING OLEFINIC COMPOUNDS AND A HALOGEN COMPONENT

[75] Inventors: Mark D. Moser, Elk Grove; Tom N. Kalnes, La Grange; Chwu-Ching Jan, Elk Grove; George R. Hibel, Schaumburg, all of Ill.

[73] Assignee: UOP, Des Plaines, Ill.

[21] Appl. No.: 899,804

[22] Filed: Jun. 17, 1992

[51] Int. Cl.$^5$ ............................................. C10G 15/02
[52] U.S. Cl. ............................ 208/262.1; 208/262.5; 210/909
[58] Field of Search ...................... 208/262.1; 210/909

[56] References Cited

U.S. PATENT DOCUMENTS

| | | | |
|---|---|---|---|
| 4,818,368 | 4/1989 | Kalnes et al. | 208/50 |
| 4,882,037 | 11/1989 | Kalnes et al. | 208/85 |
| 4,923,590 | 5/1990 | Kalnes et al. | 208/262.1 |
| 4,927,520 | 5/1990 | Kalnes et al. | 208/262.1 |
| 4,943,671 | 7/1990 | Dockner et al. | 208/262.1 |
| 5,013,424 | 5/1991 | James | 208/144 |

Primary Examiner—Helane Myers
Attorney, Agent, or Firm—Thomas K. McBride; John G. Tolomei; John G. Cutts, Jr.

[57] ABSTRACT

The invention provides a process for hydrotreating an organic feedstock containing thermally unstable compounds and a halogen component by means of contacting the organic feedstock and a gaseous recycle stream containing hydrogen and a hydrogen halide compound with a hydrogenation catalyst in a hydrogenation reaction zone to produce a hydrogenated hydrocarbonaceous stream having a reduced concentration of halogen and a halide compound stream. The resulting effluent from the hydrogenation zone is separated to produce a recycle stream containing a hydrogen halide compound.

10 Claims, 1 Drawing Sheet

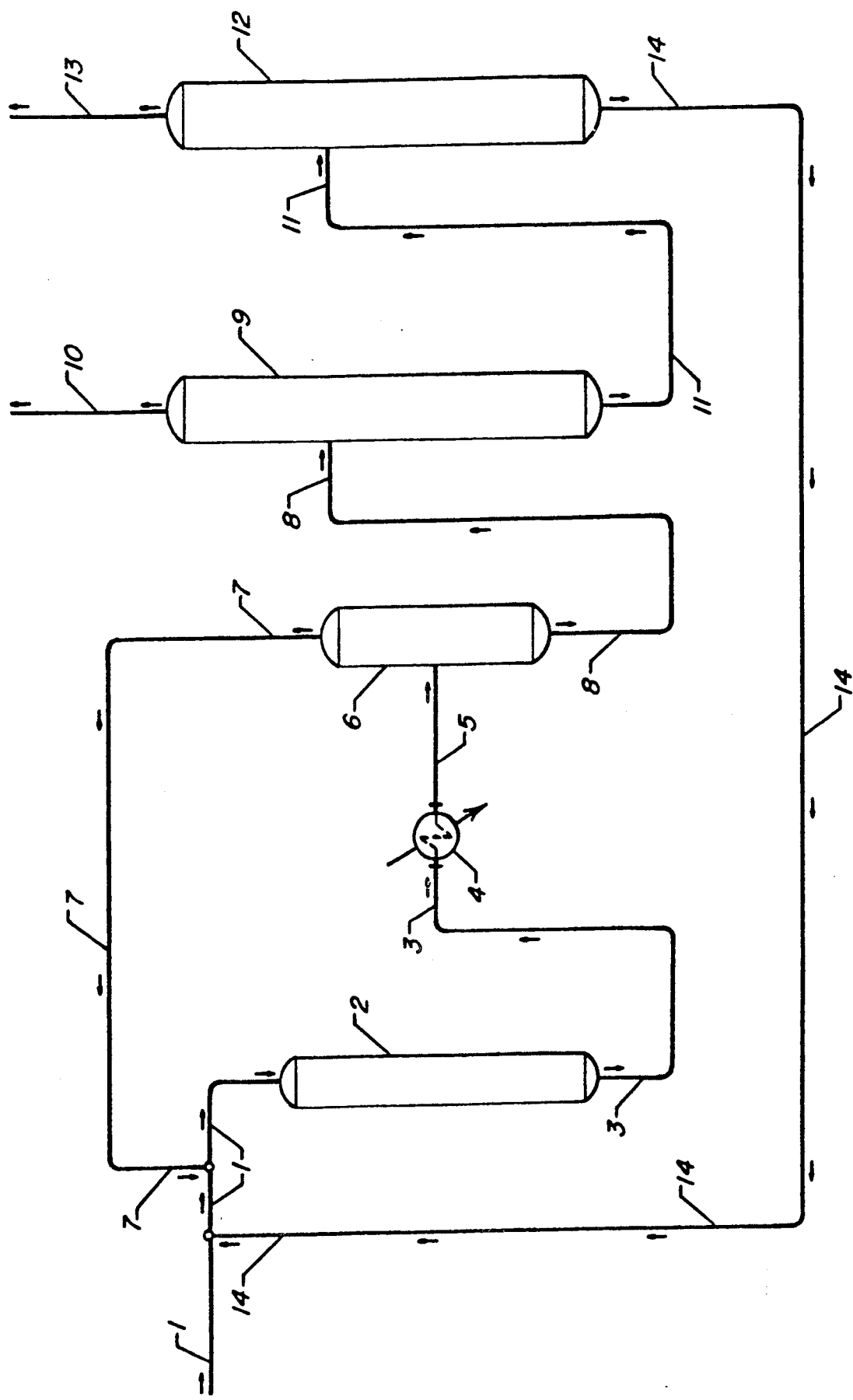

PROCESS FOR HYDROTREATING AN ORGANIC FEEDSTOCK CONTAINING OLEFINIC COMPOUNDS AND A HALOGEN COMPONENT

BACKGROUND OF THE INVENTION

The field of art to which this invention pertains is the conversion of organic feedstock which contains thermally unstable compounds and a halogen component to produce hydrocarbonaceous compounds having a reduced concentration of halogen moieties.

There has always been a demand for the conversion or disposal of waste or by-product streams which originate in the petroleum, chemical and petrochemical industries. More particularly, these by-products originate from the chlorination of olefins in the production of epichlorohydrin, propylene oxide and vinyl chloride monomers, for example. It is common in such streams for the predominate species to be halogenated alkanes, but, in addition, in some cases, there are present highly reactive species such as olefins and other thermally unstable compounds that can often polymerize or decompose during processing thereby leading to the plugging of the reactor and its associated piping. This polymerization or decomposition process is the primary mechanism leading to the formation of carbonaceous deposits and the resulting deactivation of the conversion catalyst. Previous techniques utilized to dispose of waste streams containing halogen components, olefins and other heteroatomic compounds have frequently become environmentally unpopular or illegal and, in general, have always been expensive. With the increased environmental emphasis for the treatment and recycle of chlorinated organic compounds, there is an increased need for the conversion of these products when they become unwanted. Therefore, those skilled in the art have sought to find feasible techniques to convert such feedstocks to provide hydrocarbonaceous product streams having a reduced concentration of halogen which may be safely and usefully employed or recycled. Previous techniques which have been employed include incineration and dumping which, in addition to potential pollution considerations, fail to recover valuable hydrocarbonaceous materials and the resulting halogen compounds.

INFORMATION DISCLOSURE

In U.S. Pat. No. 4,818,368 (Kalnes et al), a process is disclosed for treating a temperature-sensitive hydrocarbonaceous stream containing a non-distillable component to produce a hydrogenated distillable hydrocarbonaceous product while minimizing the degradation of the hydrocarbonaceous stream.

In U.S. Pat. No. 4,882,037 (Kalnes et al), a process is disclosed for treating a temperature-sensitive hydrocarbonaceous stream containing a non-distillable component and a distillable, hydrogenatable hydrocarbonaceous fraction to produce a selected hydrogenated distillable light hydrocarbonaceous product, a distillable heavy hydrocarbonaceous liquid product and a heavy product.

BRIEF SUMMARY OF THE INVENTION

The invention provides a process for hydrotreating an organic feedstock containing thermally unstable compounds and a halogen component by means of contacting the organic feedstock and a gaseous recycle stream containing hydrogen and a hydrogen halide compound with a hydrogenation catalyst in a hydrogenation reaction zone to produce a hydrogenated hydrocarbonaceous stream having a reduced concentration of halogen and a halide compound stream. The resulting effluent from the hydrogenation zone is separated to produce a recycle stream containing a hydrogen halide compound. Important elements of the improved process are the reduced formation of polymerized olefins or decomposed compounds in the processing plant, reduced coke formation or carbonaceous deposition on the hydrogenation catalyst, the ability to achieve longer run lengths and catalyst life, and higher conversion per pass. In addition to these operating advantages, valuable products including hydrogenated hydrocarbonaceous compounds and hydrogen halide compounds are produced while simultaneously converting unwanted by-products or wastes to thereby solve a potential pollution problem. In particular, the recycle of a hydrogen halide inhibits or reduces free radical polymerization reactions and serves as a heat sink to limit reactor temperature increases caused by exothermicity both of which result in more stable catalyst performance.

One embodiment of the invention may be characterized as a process for hydrotreating an organic feedstock containing thermally unstable compounds and a halogen component while minimizing the thermal decomposition of the thermally unstable compounds and stabilizing the activity of the hydrotreating catalyst which process comprises the following steps: (a) contacting the organic feedstock, containing thermally unstable compounds and a halogen component, and a gaseous recycle stream, comprising hydrogen and a hydrogen halide compound, with a hydrogenation catalyst in a hydrogenation reaction zone at hydrogenation reaction conditions to increase the hydrogen content of the organic feedstock and to produce a hydrogen halide compound; (b) condensing at least a portion of the resulting effluent from the hydrogenation reaction zone to produce a gaseous stream comprising hydrogen and a hydrogen halide compound, and a liquid stream comprising hydrocarbonaceous compounds; (c) recycling at least a portion of the gaseous stream comprising hydrogen and a hydrogen halide compound recovered in step (b) to the hydrogenation reaction zone in step (a); and (d) recovering a stream comprising hydrocarbonaceous compounds and having a reduced level of a halogen component.

Other embodiments of the present invention encompass further details such as preferred feedstocks, hydrogenation catalysts and operating conditions, all of which are hereinafter disclosed in the following discussion of each of these facets of the invention.

BRIEF DESCRIPTION OF THE DRAWING

The drawing is a simplified process flow diagram of a preferred embodiment of the present invention.

DETAILED DESCRIPTION OF THE INVENTION

The present invention provides an improved integrated process for hydrotreating an organic feedstock containing thermally unstable compounds and a halogen component while minimizing thermal decomposition and polymerization of thermally unstable compounds and thereby stabilizing the activity of the hydrotreating catalyst. There is a steadily increasing demand for technology which is capable of converting or hydrotreating an organic feedstock containing a halogen component and, in particular, for a process which is capable of processing such a stream which, in addition, contains thermally unstable compounds. In accordance with the present invention, it has been unexpectedly discovered that if a hydrogen halide compound is recycled to the hydrogenation reaction zone, a greatly improved process is achieved.

A wide variety of halogenated organic compounds containing thermally unstable compounds are candidates for feed streams in accordance with the process of the present invention. Examples of organic streams comprising halogenated organic compounds which are suitable for treatment by the process of the present invention are dielectric fluids, hydraulic fluids, heat transfer fluids, used lubricating oil, used cutting oils, used solvents, halogenated hydrocarbonaceous by-products, oils contaminated with polychlorinated biphenyls (PCB), halogenated wastes, by-products from the manufacture of vinyl chloride monomer, propylene oxide, allyl chloride, epichlorohydrin and other halogenated intermediates and final products, petrochemical by-products and other halogenated hydrocarbonaceous industrial wastes. Often, in a particular place or location, two or more halogenated organic streams are present and require further treatment. The halogenated organic compounds may also contain hydrogen and are therefore then referred to as hydrocarbonaceous compounds.

The process of the present invention is most advantageously utilized when the feedstock contains thermally unstable compounds which have a marked tendency to polymerize or form coke or carbonaceous deposits when raised to an elevated temperature. Previously, the undesirable reactions by thermally unstable compounds presented great difficulties for those attempting to process such feed streams because of the resulting operational problems in the operating plant. Although no limitation is intended, it is believed that by having a hydrogen halide compound present while the thermally unstable compounds of the feedstock are at an elevated temperature, the earlier operating problems are thereby obviated.

In accordance with the present invention, the halogenated organic feedstock preferably contains less than about 500 ppm by weight of water or water precursors. Examples of water precursors are oxygenated compounds which, when subjected to hydrogenation conditions, are converted into hydrogenated compounds and water. In one embodiment of the present invention, the resulting hydrogen halide may be conveniently recovered as an anhydrous hydrogen halide stream and as used herein, the term "anhydrous stream comprising hydrogen halide" connotes a stream having less than about 50 ppm by weight of water.

Preferred feedstocks comprise a component selected from the group consisting of fractionation column bottoms from the production of allyl chloride, fractionation column bottoms from the production of ethylene dichloride, by-products from the manufacture of vinyl chloride monomer, fractionation column bottoms from the production of trichloroethylene and perchlorethylene, used dielectric fluid containing polychlorinated biphenyls (PCB) and halogenated benzene, used solvents, fractionation bottoms from the purification column in epichlorohydrin production, carbon tetrachloride, 1,1,1-trichloroethane, halogenated alcohols, halogenated ethers, chlorofluorocarbons and admixtures thereof.

The halogenated organic compounds which are contemplated as feedstocks in the present invention may contain a halogen selected from the group consisting of chlorine, bromine, fluorine and iodine. Preferred halogen compounds contain a halogen selected from the group consisting of chlorine and fluorine. In addition, the halogenated organic compounds preferably contain from 1 to about 20 carbon atoms per molecule.

In accordance with the present invention, a feedstock containing halogenated organic compounds is introduced in admixture with a hydrogen-rich, gaseous recycle stream containing a hydrogen halide and, optionally, a recycle stream comprising unreacted halogenated organic compounds into a catalytic hydrogenation zone containing hydrogenation catalyst and maintained at hydrogenation conditions. This catalytic hydrogenation zone may contain a fixed, ebullated or fluidized catalyst bed. Moreover, the hydrogenation reaction zone may consist of multiple catalyst beds operated at various conditions. This reaction zone is preferably maintained at conditions which are chosen to dehalogenate the halogenated organic compounds which are introduced thereto. The catalytic hydrogenation zone is preferably maintained under an imposed pressure from about atmospheric to about 2000 psig and more preferably under a pressure from about 100 psig to about 1800 psi. Suitably, such reaction is conducted with a maximum catalyst bed temperature in the range of about 50° F. (10° C.) to about 850° F. (454° C.) selected to perform the desired dehalogenation conversion to reduce or eliminate the concentration of halogenated organic compounds contained in the combined feed stream. In accordance with the present invention, it is contemplated that the desired hydrogenation conversion includes, for example, dehalogenation and hydrocracking. In addition, the effluent from the hydrogenation zone contains essentially no olefinic compounds or other thermally unstable compounds which may be deleterious to any other further processing steps. Further preferred operating conditions include liquid hourly space velocities in the range from about 0.05 hr$^{-1}$ to about 20 hr$^{-1}$ and hydrogen circulation rates from about 200 standard cubic feet per barrel (SCFB) to about 150,000 SCFB, preferably from about 200 SCFB to about 100,000 SCFB.

As used in the present invention, the term "hydrotreating" or "hydrogenation" is meant to include reactions whereby the organic reactants achieve an increased hydrogen content, regardless of whether this is achieved by olefin saturation, diolefin saturation, desulfurization, denitrification or dehalogenation, for example.

In addition to the above-described operating conditions, in the present invention, it is essential that a hydrogen halide be recycled along with the hydrogen-rich gaseous recycle stream in order to achieve the unexpected result of minimizing the polymerization of olefinic compounds or decomposition of other thermally unstable compounds which are contained in the fresh feedstock. The level of hydrogen halide which is recycled to the hydrogenation reaction zone is a function of the level of the thermally unstable compounds which are contained in the original feedstock. Although a certain level of the hydrogen halide in the hydrogenation zone is required to achieve the results of the present invention, a higher level or concentration of hydrogen halide is contemplated and not foreclosed by the teachings contained herein. The concentration of hydrogen halide in the hydrogen-rich gaseous recycle stream is preferably from about 2 mole percent to about 60 mole percent. In addition, it is contemplated that the hydrogen halide is present in an amount from about 5 wt. % to about 200 wt. % based upon the weight of the combined feedstock and recycle, if any, to the hydrogenation reaction zone. Although the overall objective of the process of the present invention is to remove halogen via dehalogenation from halogenated organic compounds, we have discovered that when feedstocks are thermally unstable, it is advantageous to initially expose the feedstock to a hydrogen halide-containing recycle stream.

The preferred catalytic composite disposed within the hereinabove described hydrogenation zone can be characterized as containing a metallic component having hydrogenation activity, which component is combined with a suitable refractory carrier material of either synthetic or natural origin. The precise composition and method of manufacturing the carrier material is not considered essential to the present invention. Preferred carrier materials are alumina, silica, carbon and mixtures thereof. Suitable metallic components having hydrogenation activity are those selected from the group comprising the metals of Groups VIB and VIII of the Periodic Table, as set forth in the *Periodic Table of Elements*, E. H. Sargent and Company, 1964. Thus, the catalytic composite may comprise one or more metallic components from the group of molybdenum, tungsten, chromium, iron, cobalt, nickel, platinum, palladium, iridium, osmium, rhodium, ruthenium, and mixtures thereof. The concentration of the catalytically active metallic component, or components, is primarily dependent upon a particular metal as well as the physical and/or chemical characteristics of the particular hydrocarbon feedstock. For example, the metallic components of Group VIB are generally present in an amount within the range of from about 1 to about 20 weight percent, the iron-group metals in an amount within the range of about 0.2 to about 10 weight percent, whereas the noble metals of Group VIII are preferably present in an amount within the range of from about 0.1 to about 5 weight percent, all of which are calculated as if these components existed within the catalytic composite in the elemental state. It is further contemplated that hydrogenation catalytic composites may comprise one or more the following components: cesium, francium, lithium, potassium, rubidium, sodium, copper, gold, silver, cadmium, mercury and zinc. Preferred hydrogenation catalysts comprise alumina and palladium.

In accordance with the present invention, the hydrocarbonaceous effluent containing at least one hydrogen halide compound from the hydrogenation zone is cooled and introduced into a vapor-liquid separator to produce a hydrogen-rich, gaseous recycle stream containing hydrogen halide and a liquid stream comprising hydrogenated hydrocarbonaceous compounds and hydrogen halide. One technique which may be used in order to adjust the amount of hydrogen halide which is recycled in the hydrogen-rich gaseous recycle stream is to select the operating pressure and the amount of cooling performed on the effluent and the resulting operating temperature of the vapor-liquid separator. In accordance with the present invention, it is contemplated that the vapor-liquid separator is operated at a pressure between about 400 and about 1800 psig and at a temperature from about $-70°$ F. ($-57°$ C.) to about 60° F. (16° C.). The resulting liquid stream comprising hydrogenated hydrocarbonaceous compounds and hydrogen halide is separated to produce an anhydrous stream comprising hydrogen halide and a liquid stream comprising hydrogenated hydrocarbonaceous compounds and unreacted organic compounds. This resulting liquid stream is then separated to produce a recycle stream comprising unreacted halogenated organic compounds which is introduced into the hydrogenation reaction zone and a hydrogenated hydrocarbonaceous stream having a reduced level of halogen. In accordance with one embodiment of the present invention, the hydrogen halide compound is recovered as an anhydrous product stream. This permits the subsequent recovery and use of a desirable and valuable hydrogen halide compound.

As described above, the resulting hydrogenated hydrocarbonaceous effluent from the hydrogenation reaction zone is preferably separated to produce a hydrogen-rich gas phase containing a hydrogen halide compound and a liquid hydrocarbonaceous stream in a separation zone which is maintained at essentially the same pressure as the hydrogenation reaction zone and at a temperature in the range from about $-70°$ F. ($-57°$ C.) to about 60° F. (16° C.), and as a consequence, the liquid hydrocarbonaceous stream contains dissolved hydrogen, dissolved hydrogen halide and low molecular weight normally gaseous hydrocarbons if present. In accordance with the present invention, the hydrogenated liquid phase comprising the hydrogen chloride is separated to produce an anhydrous hydrogen halide stream by separating, for example, by stripping, flashing or fractionating. After the hydrogen halide stream has been produced and removed from the process, a resulting hydrocarbonaceous stream is separated to produce a hydrocarbonaceous stream, primarily comprising hydrogenated hydrocarbonaceous compounds and a stream primarily comprising halogenated organic compounds which may then be recycled to the hydrogenation conversion zone if desired. Such a separation may be conducted in any convenient manner such as, for example, stripping, flashing or fractionating.

In the drawing, the process of the present invention is illustrated by means of a simplified flow diagram in which such details as total number of reaction zone and drier vessels, pumps, instrumentation, heat-exchange and heat-recovery circuits, compressors and similar hardware have been deleted as being non-essential to an understanding of the techniques involved. The use of such miscellaneous appurtenances are well within the purview of one skilled in the art.

DETAILED DESCRIPTION OF THE DRAWING

With reference now to the drawing, an organic feed stream containing thermally unstable compounds and a halogen component is introduced into the process via conduit 1 and is contacted with a hydrogen-rich gaseous recycle stream containing a hydrogen halide compound which is provided via conduit 7 and is hereinafter described. The organic feed stream containing thermally unstable compounds, the hydrogen-rich gaseous recycle stream containing a hydrogen halide compound and an unconverted organic recycle stream provided via conduit 14 and hereinafter described are introduced into hydrogenation reaction zone 2. The resulting hydrogenated organic stream is removed from the hydrogenation reaction zone 2 via conduit 3, is cooled in heat exchanger 4 and introduced into vapor liquid separator 6 via conduit 5. A hydrogen-rich gaseous stream containing a hydrogen halide compound is removed from vapor-liquid separator 6 via conduit 7 and recycled as described hereinabove. Since hydrogen is lost in the process by means of a portion of the hydrogen being dissolved in the exiting liquid hydrocarbon and hydrogen being consumed during the hydrogenation reaction, it is necessary to supplement the hydrogen-rich gaseous stream with a make-up hydrogen from some suitable external source, for example, a catalytic reforming unit or a hydrogen plant. Make-up hydrogen may be introduced into the system at any convenient and suitable point which is not shown on the drawing. A liquid hydrogenated hydrocarbonaceous stream containing hydrogen and a hydrogen halide in solution is removed from vapor liquid separator 6 and is introduced into fractionation zone 9 via conduit 8. A product stream containing hydrogen halide is removed from fractionation zone 9 via conduit 10 and recovered. A liquid distillable hydrogenated hydrocarbonaceous stream is removed from fractionation zone 9 via conduit 11 and is introduced into fractionation zone 12. A product stream containing hydrocarbonaceous compounds having a reduced concentration of halogen is removed from fractionation zone 12 via conduit 13 and recovered. A liquid stream containing unconverted organic compounds is removed from fractionation zone 12 via conduit 14 and is recycled to hydrogenation reaction zone 2 via conduit 14 as described hereinabove.

The following examples are presented for the purpose of further illustrating and comparing the process of the present invention and to indicate the benefits afforded by the utilization thereof in producing a hydrogenated hydrocarbonaceous stream from an organic feedstock containing thermally unstable compounds and a halogen component. Example 1 is a control experiment using an olefinic feedstock without a hydrogen halide recycle. Example 2 is another control experiment with a non-olefinic feedstock having thermal instability without hydrogen halide recycle.

EXAMPLE 1

This example demonstrates a process for the conversion of a feedstock containing 70% dichloropropane and 30% dichloropropene wherein the feedstock was passed over a dechlorination catalyst containing palladium and alumina at a weight hourly space velocity (WHSV) of 0.6, a pressure of 750 psig, a hydrogen circulation of 91,000 standard cubic feet per barrel (SCFB) with no hydrogen halide compound recycle and an average catalyst bed temperature of about 140° F. (60° C.). After about 42 hours of operation, the bench scale reactor plugged with carbonaceous deposits due to the polymerization of olefins.

EXAMPLE 2

This example demonstrates a process for the conversion of a feedstock having the characteristics presented in Table 1 wherein the feedstock was passed over a dechlorination catalyst containing palladium and alumina at a weight hourly space velocity of 0.6, a pressure of 750 psig, a gas circulation rate of 55,000 SCFB (>80 mole percent of hydrogen, 0 mole percent HCl and the remainder propane) and an average catalyst bed temperature in the range of 248° F. (120° C.) to 320° F. (160° C.). After 162 hours of operation, the run was discontinued to analyze the catalyst for coke or carbonaceous components. The catalyst at the top of the catalyst bed contained 5.63 weight percent carbonaceous deposit while the catalyst at the bottom of the catalyst bed contained 2.65 weight percent carbonaceous deposit.

TABLE 1

| FEEDSTOCK ANALYSIS | |
|---|---|
| Component | Weight Percent |
| 1,2 dichloropropane | 77.0 |
| Epichlorohydrin | 4.1 |
| 2-Methyl-2-pentenal | 1.7 |
| Trichloropropane | 0.9 |
| Dichloropropyl Ether Isomers | 10.6 |
| Unidentified Chlorinated Hydrocarbons | 4.7 |
| Trace Components | 1.0 |
| Olefinic Species | 0 |

EXAMPLE 3

This example is conducted in accordance with one embodiment of the present invention and the recycle of hydrogen halide reduces the carbonaceous or coke deposit. A feedstock containing 91.9 weight percent dichloropropane and 7.5% dichloropropene was contacted with a dechlorination catalyst containing palladium and alumina at a WHSV of 0.3, an operating pressure of 750 psig, a hydrogen circulation rate of 45,000 SCFB and an average catalyst bed temperature of about 311° F. (155° C.). The hydrogen chloride which was produced in the dechlorination reaction was recycled at an average value of 31 mole % of the recycle gas. The operation was considered good but was discontinued after 1350 hours of stable performance to analyze the catalyst for coke or carbonaceous components. The catalyst at the top of the catalyst bed contained 2.93 weight percent carbonaceous deposit while the catalyst at the bottom of the catalyst bed contained only 0.14 weight percent carbonaceous deposit. These results show the suppression of carbonaceous deposits on the catalyst during the recycling of hydrogen chloride.

The foregoing description, drawing and examples clearly illustrate the advantages encompassed by the process of the present invention and the benefits to be afforded with the use thereof.

What is claimed:

1. A process for hydrotreating an organic feedstock containing thermally unstable compounds and a halogen component while minimizing the thermal decomposition of said thermally unstable compounds and stabilizing the activity of the hydrotreating catalyst which process comprises the following steps:

(a) contacting said organic feedstock, containing thermally unstable compounds and a halogen component, and a gaseous recycle stream, comprising hydrogen and a hydrogen halide compound, with a hydrogenation catalyst in a hydrogenation reaction zone at hydrogenation reaction conditions to increase the hydrogen content of the organic feedstock and to produce a hydrogen halide compound;

(b) condensing at least a portion of the resulting effluent from said hydrogenation reaction zone to produce a gaseous stream comprising hydrogen and a hydrogen halide compound, and a liquid stream comprising hydrocarbonaceous compounds;

(c) recycling at least a portion of said gaseous stream comprising hydrogen and a hydrogen halide compound recovered in step (b) to said hydrogenation reaction zone in step (a); and (d) recovering a stream comprising hydrocarbonaceous compounds and having a reduced level of a halogen component.

2. The process of claim 1 wherein said organic feedstock contains compounds having from 1 to about 20 carbon atoms per molecule.

3. The process of claim 1 wherein said organic feedstock comprises a thermally unstable component selected from the group consisting of olefinic and heteroatomic compounds.

4. The process of claim 1 wherein said organic feedstock contains a halogen component selected from the group consisting of chlorine, fluorine, bromine and iodine.

5. The process of claim 1 wherein said gaseous recycle stream comprising hydrogen and a hydrogen halide compound contains from about 2 mole percent to about 60 mole percent hydrogen halide.

6. The process of claim 5 wherein said hydrogen halide is present in at least an amount sufficient to minimize the thermal decomposition of said thermally unstable compounds.

7. The process of claim 1 wherein said hydrogenation catalyst comprises a Group VIII metal on a refractory inorganic oxide support.

8. The process of claim 1 wherein said hydrogenation catalyst comprises palladium and alumina.

9. The process of claim 1 wherein said hydrogenation reaction zone is operated at hydrogenation reaction conditions including a temperature from about 50° F. (10° C.) to about 850° F. (454° C.), a pressure from about 100 psig to about 1800 psig, a hydrogen circulation rate from about 200 SCFB to about 150,000 SCFB and a hydrogen halide recycle rate from about 5 weight percent to about 200 weight percent based upon the feedstock to said hydrogenation reaction zone.

10. The process of claim 1 wherein said organic feedstock comprises a component selected from the group consisting of fractionation bottoms from the production of allyl chloride, ethylene dichloride, trichloroethylene, epichlorohydrin and perchloroethylene; by-products from the manufacture of vinyl chloride monomer, used dielectric fluid containing polychlorinated biphenyls, halogenated benzene, carbon tetrachloride, 1,1,1-trichloroethane, halogenated alcohols, halogenated ethers, chlorofluorocarbons and admixtures thereof.

* * * * *